(12) United States Patent
Eshghi

(10) Patent No.: US 7,761,466 B1
(45) Date of Patent: Jul. 20, 2010

(54) HASH-BASED IMAGE IDENTIFICATION

(75) Inventor: Kave Eshghi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 267 days.

(21) Appl. No.: 11/830,841

(22) Filed: Jul. 30, 2007

(51) Int. Cl.
*G06F 17/23* (2006.01)

(52) U.S. Cl. .................. 707/772; 707/705; 707/758; 707/769; 707/736

(58) Field of Classification Search .............. None
See application file for complete search history.

(56) References Cited

U.S. PATENT DOCUMENTS

| | | | |
|---|---|---|---|
| 6,711,293 B1 * | 3/2004 | Lowe | 382/219 |
| 7,043,474 B2 * | 5/2006 | Mojsilovic et al. | 707/6 |
| 7,072,872 B2 * | 7/2006 | Caid et al. | 706/14 |
| 7,162,338 B2 * | 1/2007 | Goncalves et al. | 701/23 |
| 2006/0101060 A1 | 5/2006 | Li et al. | |

OTHER PUBLICATIONS

Lowe, David G.; "Distintive Image Features from Scale-Invariant Keypoints", Jan. 5, 2004, University of British Columbia, Vancouver, CA.*
Mortensen, Eric N., Deng, Hongli, Shapiro, Linda; "A SIFT Descriptor with Global Context", 2005, IEEE Computer Society Conference on Computer Vision and Pattern Recognition.*
Guo, Xin C.; Hatzinakos, Dimitrios; Content Based Image Hashing Via Wavelet and Radon Transfom, 2007, Springer-Verlag, LNCS 4810, pp. 755-764.*
Qu, Huaijing; Peng, Yuhua; Sun, Weifeng; Texture Image Retrieval based on Contourlet Coefficient Modeling with Generalized Gaussian Distribution, 2007, Springer-Verlag, LNCS 4683, pp. 493-502.*
Archambeau, Cedric; Verleysen, Michel; "Fully nonparametric Probability Density Function Estimation with Finite Gaussian Mixture Models", 2003, International Conference on Advances in Pattern Recognition—5th, Allied Publishers, pp. 81-84.*
Yin, Qingbo; Kim, Jong Nam; Moon, Kwang-Seok; "Rotation Invariant Texture Classification Using Gabor Wavelets", 2007, Springer-Verlag, pp. 10-17.*
Kelman, Avi; Sofka, Michal; Stewart, Charles V., "Keypoint Descriptors for Matching Across Multiple Image Modalities and Non-linear Intensity Variations", Computer Vision and Pattern Recognition, 2007. CVPR '07. IEEE Conference, Jun. 17-22, 2007, Minneapolis, MN, USA, ISBN: 1-4244-1180-7.

(Continued)

*Primary Examiner*—Mohammad Ali
*Assistant Examiner*—Sheryl Holland

(57) ABSTRACT

Provided are, among other things, systems, methods and techniques for identifying target images in the following manner. Keypoints at different locations within a sample image and descriptor vectors for the keypoints are obtained, the descriptor vectors describing local image information around the keypoints. Features are generated based on hashes of data vectors that include at least one of the descriptor vectors, and an image-feature database is searched for the features. Target images are retrieved and provided based on the number of the features for which corresponding features exist in individual database images whose features are represented in the image-feature database. The foregoing hashes are performed using a hash function for which a probability that the hash of an arbitrary first vector corresponds to the hash of an arbitrary second vector is a function of an angle between the first vector and the second vector.

18 Claims, 3 Drawing Sheets

OTHER PUBLICATIONS

Yan Ke, Rahul Sukthankar, Larry Huston. Efficient Near-duplicate Detection and Sub-image Retrieval. Proceedings of ACM International Confereence on Multimedia (MM), Aug. 2004, IRP-TR-04-07.
Charikar, M. S. 2002. Similarity estimation techniques from rounding algorithms. In Proceedings of the Thiry-Fourth Annual ACM Symposium on theory of Computing (Montreal, Quebec, Canada, May 19-21, 2002). STOC '02. ACM Press, New York, NY, 380-388. DOI= http://doi.acm.org/10.1145/509907.509965.
Huston, L.; Sukthankar, R.; Ke, Y., "Evaluating keypoint methods for content-based copyright protection of digital images", Conference on Multimedia and Expo, 2005. ICME 2005. IEEE International, Jul. 6-8, 2005, ISBN: 0-7803-0331-7.

* cited by examiner

HASH-BASED IMAGE IDENTIFICATION

FIELD OF THE INVENTION

The present invention pertains to systems, methods, computer programs and techniques for target images, e.g., for the purpose of executing image-based queries against an image database or clustering visually similar images within a database.

BACKGROUND

Recently, a significant amount of effort has been devoted to constructing automated systems and processes for identifying images (e.g., photographs) that are visually similar to a sample image. Such automated systems and processes are desired for use, e.g., in order to identify any unauthorized uses of a particular photograph.

Conventional techniques directed toward this goal typically extract a set of "keypoints" (sometimes referred to as "attention points" or "interest points") from each photograph, together with a set of information (e.g., a descriptor vector) describing each such keypoint. The keypoints typically are the distinctive points on the image, such as points on corners and edges. The keypoints and associated information are then compared for different images in order to determine whether the different images are visually similar. That is, given two similar photographs, the assumption is that a keypoint in the first photograph is likely to have a matching keypoint in the other. A representative conventional approach to determine the degree of similarity between two photographs P1 and P2 based on their sets of keypoints K1 and K2, respectively, requires a comparison between each point in K1 and each point in K2.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

In the preferred embodiments, the approach of the present invention is to extract, for each photograph (or other image), a set of features F such that if two photographs are similar, the overlap between their set of features is high, and if the photographs are dissimilar, the overlap between their features is small. In other words, the preferred embodiments of the invention convert the photograph similarity problem into a set similarity problem, where the similarity between two sets is defined as a function of the size of their intersection (e.g., the size of their intersection divided by the size of their union). Having done that, very efficient indexing and/or sort-based techniques can be used to find pairs of photographs whose feature sets overlap. Such approaches often are much more efficient than conventional techniques, such as the conventional approach described above.

It is noted that for purposes of the present invention, two photographs preferably are considered to be similar if they are either two versions of the same photograph (e.g., one is an edited version of the other) or if they are two different photographs taken of the same scene, with some variations (e.g. two different cameras taking photographs of the same scene).

Figure 1:
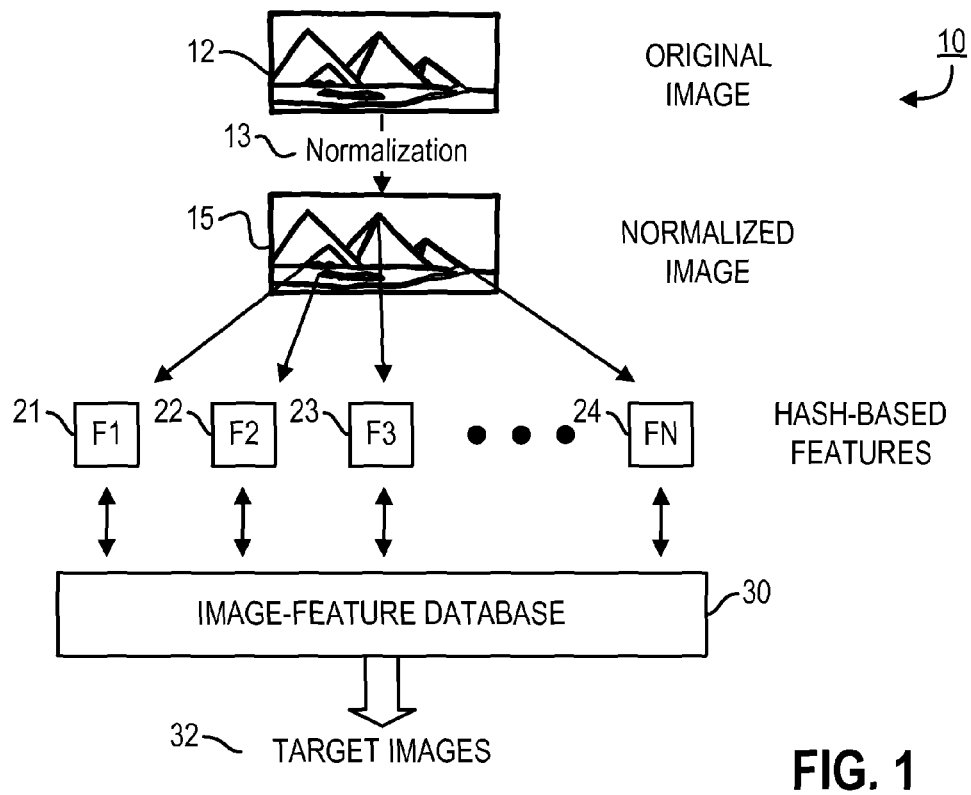
FIG. 1 is a block diagram of a representative system for finding one or more images that match an original image.

FIG. 1 is a block diagram of an exemplary system 10 for finding one or more target images 32 that correspond to an original image 12, according to a representative embodiment of the present invention. Initially, the original input image 12 is normalized 13 to a standard size (e.g., 500 pixels by 400 pixels), such as by using conventional downsampling and/or interpolation techniques. Alternate embodiments of the invention utilize any of a variety of other kinds of normalization processing 13 (e.g., intensity, contrast, color balance) in addition to, or instead of, such size normalization. Still further embodiments omit normalization processing 13 altogether. In embodiments where normalization processing 13 is used, such processing 13 preferably is fully automated, so that it can be implemented in software or in any of the other ways described herein.

Keypoints and associated descriptor vectors are then extracted from the normalized image 15 (or the original image 12, if no normalization processing 13 has been performed) and used to generate a set of features (e.g., features 21-24), preferably in a fully automated manner. In this regard, any conventional keypoint-detection technique can be used. Examples include a Laplacian-of-Gaussian (LoG) detector, a Harris corners detector or a maximally-stable extremal regions (MSERs) detector. Similarly, any conventional technique for generating the descriptor vectors can be used. Examples include the Scale Invariant Feature Transform (SIFT) descriptor or any variant thereof, such as the Gradient Mirroring and/or Edge Precursors variants.

In the preferred embodiments, any or all of the following pieces of data are determined for each keypoint:
1. The (x, y) coordinates of the keypoint.
2. The keypoint descriptor, which typically is a mathematical object (such as a vector in n-dimensional space).
3. The keypoint orientation, which is an angle associated with the descriptor, typically relative to the x axis of the photograph, usually showing the direction of the maximum gradient of the pixel values.
4. The keypoint scale, which determines the granularity of the photograph information used for creating the keypoint. Higher scale uses coarser grain features, and smaller scale uses finer grain features. Scale typically also determines the size of the area around the keypoint that is encompassed by the descriptor.

As discussed in more detail below, the individual features 21-24 preferably are generated by calculating one or more hashes of data vectors that consist of or include the identified descriptor vectors. Although FIG. 1 indicates that each feature is generated from only a single keypoint, in certain embodiments of the invention one or more of the individual features 21-24 are generated based on information from multiple keypoints, as discussed in more detail below.

Each resulting feature 21-24 is then individually compared against an image-feature database 30 that includes similarly calculated features that were generated for a large number of other images. In the preferred embodiments, the target images 32 are based on the number of features such images have in common with the original image 12 (or, correspondingly, its normalized image 15). For example, in one embodiment in which system 10 is an image-retrieval system, only images 32 that have a minimum specified number of corresponding features are retrieved and/or the images are displayed in order based on the number of corresponding features (and/or other indicators of their relevance). In certain representative embodiments, image-feature database 30 includes one or more hash tables or other kinds of indexes, and the features 21-24 are used to query such index(es).

Figure 2:
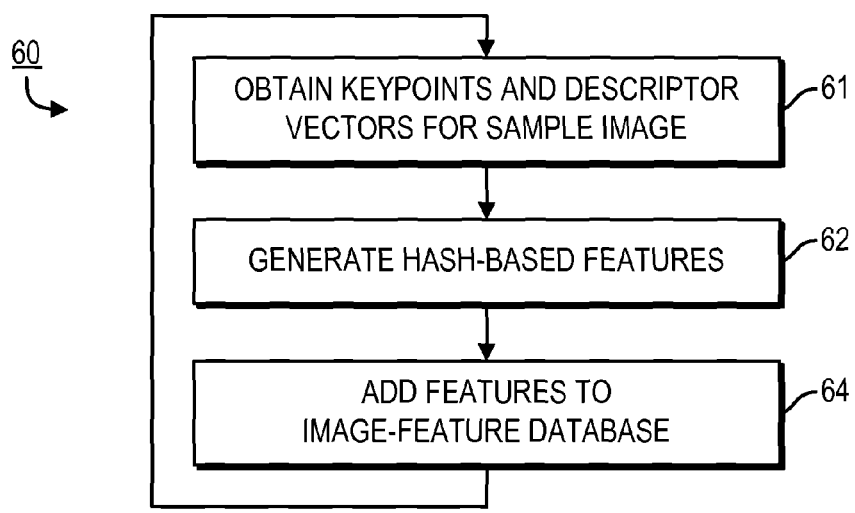
FIG. 2 is a flow diagram illustrating a representative process for generating an image-feature database.

FIG. 2 is a flow diagram illustrating a process 60 for generating image-feature database 30. In the preferred embodiments, process 60 is fully automated, so that it can be implemented in software or in any of the other ways described herein. In the following discussion of FIG. 2, certain examples are provided to help illustrate some of the described concepts. However, such examples should not be taken as limiting.

Initially, in step 61 a set of keypoints and corresponding descriptor vectors are obtained for a sample image. This sample image generally corresponds to the normalized image 15 (or, if no normalization processing 13 has been performed, to the original image 12) discussed above. The keypoints and corresponding descriptor vectors can be determined, e.g., using any conventional technique, such as any of the techniques mentioned above.

Figure 3:
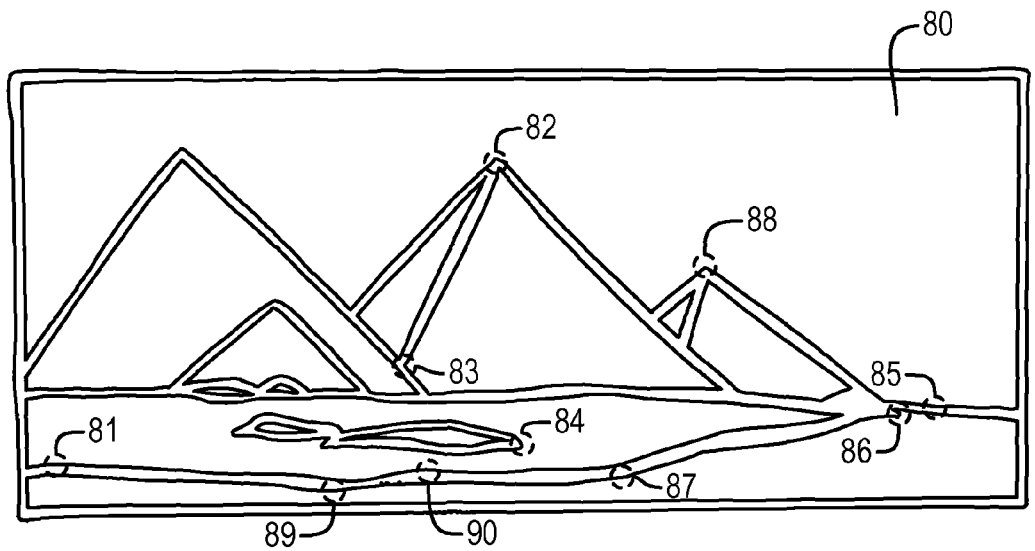
FIG. 3 illustrates a representative sample image with a representative subset of its keypoints identified.

An example of a sample image 80, together with certain representative keypoints 81-90, is illustrated in FIG. 3. For ease of illustration, only a few keypoints 81-90 are shown for image 80 in FIG. 3; in practice, however, a typical image often will have hundreds of keypoints (e.g., around 500) identified for it. It is noted that the keypoints and corresponding descriptor vectors obtained in this step 61 could have been previously generated, in which case they simply are input into the process 60 in step 61. Otherwise, such information preferably is generated on-the-fly in step 61.

In step 62, a set of hash-based features is generated for the sample image. In the preferred embodiments, such features are based on hashes of data vectors that include at least one of the descriptor vectors. As used herein, a "hash" refers to a characteristic data string (preferably, for the purposes of the present invention, a bit vector) generated from a larger data vector, and a "hash function" refers to a function that generates hashes in a systematic way from arbitrary input data vectors.

In one embodiment, each feature generated in step 62 is a hash of a different one of the descriptor vectors, using the same hash function, so that the number of generated features is equal to the number of keypoints obtained for the sample image in step 61. More preferably, in this embodiment each of the features is generated by using a hash function for which the probability that the hash of an arbitrary first vector matches the hash of an arbitrary second vector is a function of the angle between the first vector and the second vector (preferably, varying inversely with such angle).

In a more specific embodiment, the hash function H takes as input a k-dimensional vector of real numbers and produces as output an n-dimensional vector of bits (0 or 1), where, if V and V' are two k-dimensional vectors of real numbers and h=H(V) and h'=H(V), then for any i, $0 \leq i < n$, $$Pr(h[i] = h'[i]) = 1 - \frac{\theta(V, V')}{\pi},$$

where $\theta(V,V')$ is the angle between the two vectors V and V', and $h[i]$ and $h'[i]$ are the $i^{th}$ bits of h and h', respectively.

Such a hash function H can be generated, e.g., in the following manner. First, n random vectors $\vec{r}_i$ are selected from the k-dimensional Gaussian distribution (i.e., each coordinate of each vector $\vec{r}_i$ being drawn from the 1-dimensional Gaussian distribution). Then, the hash function H is defined with respect to an arbitrary input vector V as:

$$h[i] = \begin{cases} 1 & \text{if } \vec{r}_i \cdot V \geq 0 \\ 0 & \text{if } \vec{r}_i \cdot V < 0 \end{cases}.$$

See, e.g., Moses S. Charikar, "Similarity Estimation Techniques from Rounding Algorithms", STOC'02, May 19-21, 2002, Montreal, Quebec, Canada.

The foregoing hash function essentially requires n binary comparisons to selected (in this example, randomly selected) hyperplanes (i.e., each hyperplane being orthogonal to the corresponding vector $\vec{r}_i$). It is noted that for any of the hash functions H, as defined above, the probability of the hash values matching at any given bit position is approximately equal to $\cos \theta(V,V')$, i.e., $$\cos \theta \approx 1 - \frac{\theta}{\pi}.$$

Another property of any of such hash functions H is that the Hamming distance between two hashes indicates the amount of the similarity between the original vectors (in this example, the descriptor vectors). In alternate embodiments, any other hash function that has this property instead is used.

Alternatively, rather than generating each feature based solely on a single image keypoint, in certain embodiments some or all of the features are based on multiple keypoints. This approach often results in features that are more selective than single-keypoint features. In order to take full advantage of such additional selectivity, it generally is preferable to incorporate into each such feature information describing some aspect of the relationship between different keypoints in the subject image.

For example, in certain embodiments the features incorporate information pertaining to the relative position of one keypoint to another. In one such embodiment, each feature includes the orientations of different keypoints, but expressed relative to the line that joins two keypoints. The resulting feature clearly is rotation-independent, while at the same time also including information pertaining to the relationship between keypoints.

A specific approach for generating the features in accordance with this embodiment, defines a feature, for each selected pair of keypoints, as the tuple:

$<h_i, h_j, Q(\alpha), Q(\beta)>$, where $p_1, p_2, \ldots, p_q$ are the keypoints of the subject photograph P; $h_1, h_2 \ldots h_q$ are the hashes of the corresponding descriptor vectors for such keypoints (e.g., using any of the hash functions H, as discussed above); $p_i$ and $p_j$ are the two keypoints included in the feature; $\alpha$ is the orientation of the point $p_i$ relative to the line joining $p_i$ and $p_j$; $\beta$ is the orientation of the point $p_j$ relative to the line joining $p_i$ and $p_j$; and Q is a quantization function that maps values between 0 and $2\pi$ to integers in the range 0 to d, d being the degree of fineness with which angles are to be represented, e.g., $$Q(x) = \left\lfloor \frac{kx}{2\pi} \right\rfloor,$$

where $\lfloor \ \rfloor$ is the floor function, i.e., returning only the integer part of any real-number argument.

In this embodiment, a feature of P preferably is defined for two keypoints $p_i$ and $p_j$ only if: (1) i#j; and (2) $h_i$<$h_j$ according to some ordering on hashes (for example, considering hashes as integers, then in one embodiment the ordering is the numerical ordering of the integers). Also, depending upon the particular embodiment, additional criteria are specified on which pairs of keypoints will be used to generate features.

For example, in one embodiment features are only defined for pairs of keypoints that are within a certain distance range from each other (e.g., distance being calculated as the Euclidean distance, in pixels, between the keypoints). Imposition of such a distance range often can reduce the possibility that the angular information will be overly sensitive to variations (if the keypoints are too closely spaced) and increase the likelihood that the keypoints are related to each other in the image (by requiring them to be relatively close to each other in the picture). For normalized images of 500 pixels by 400 pixels, features preferably are defined only for pairs of keypoints that are from 20-80 pixels apart. More generally, features preferably are defined only for pairs of keypoints that are separated by at least 2-6% of the picture's maximum dimension (vertical or horizontal) and, at the same time, that are separated by not more than 10-30% of the picture's minimum dimension (vertical or horizontal). However, either of the foregoing minimum or maximum distance may be used as a criterion without reference to the other.

Figure 4:
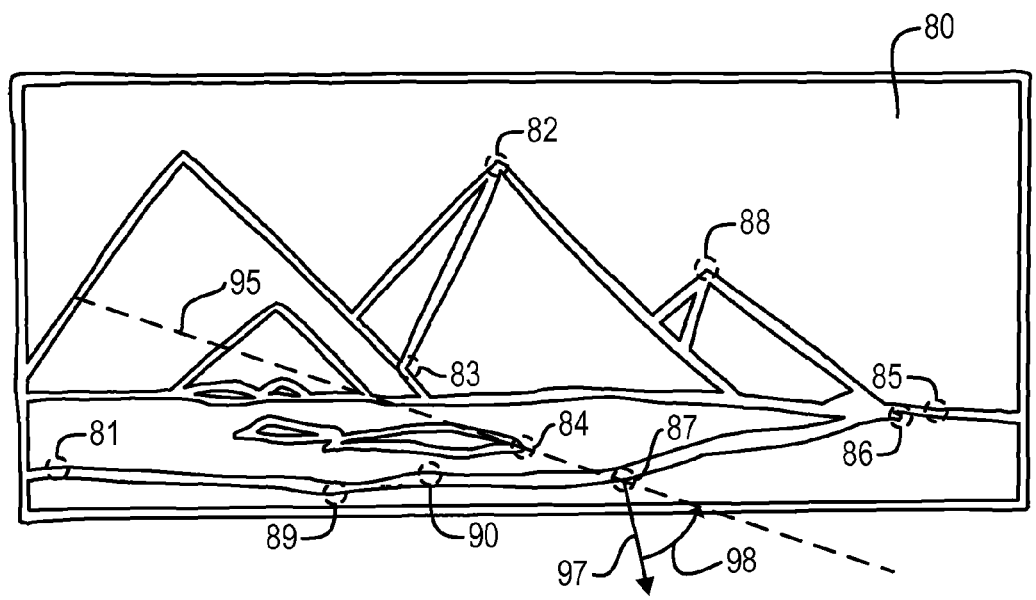
FIG. 4 illustrates a representative sample image, showing a graphical depiction of one way in which relational information between two keypoints can be determined.

An example showing certain of the information incorporated into a feature in this embodiment of the invention is illustrated in FIG. 4. All pairs of the keypoints 81-90 in FIG. 4 are evaluated. However, some (e.g., keypoints 85 and 86) are rejected as being too close to each other and some (e.g., keypoints 81 and 85) are rejected as being too distant from each other.

A feature is generated for the pair of keypoints 84 and 87. As noted above, the feature preferably includes separate hashes of the two individual descriptor vectors for the corresponding individual keypoints 84 and 87. In addition, the feature preferably also includes the quantized orientation of each included keypoint (84 and 87) relative to the line 95 between keypoints 84 and 87. For example, the orientation 97 of keypoint 87 (e.g., the direction of maximum gradient) relative to line 95 is the angle 98, which preferably is quantized, as described above, and added to the feature.

Variations on the foregoing approach are possible. For example, rather than generating individual hashes of the descriptor vectors, in one embodiment a single hash is performed with respect to a concatenation of the two descriptor vectors. In an alternate embodiment, the separate hashes are calculated for the individual keypoints, but in this case the hash is of a data vector formed as a concatenation of the descriptor vector and the orientation relative to the line joining the two keypoints (e.g., line 95). In a still further embodiment, a single hash is generated for a data vector formed as a concatenation of both descriptor vectors and both orientations (e.g., relative to line 95). In any of the foregoing embodiments, the hashes preferably are calculated using any of the hash functions H described above.

Also, it should be noted that in other embodiments of the invention, one or more other metrics pertaining to the relationship between multiple keypoints are used, either in addition to or instead of the line or of the angle of the line between keypoints (e.g., line 95). For example, in certain alternate embodiments the feature includes information pertaining to the ratio of the scales between two or more keypoints, the pixel intensity values along the line between keypoints (e.g., line 95) and/or any other information that is expected to be similar between similar images (according to the desired similarity criterion).

In each of the examples described above, the length of the hash determines how sensitive the resulting feature will be to variations. Thus, for example, when comparing features that are direct hashes of individual descriptor vectors for corresponding keypoints, use of a longer hash generally requires the two descriptor vectors to be more similar to each other in order for the hashes to match identically (which is what the process ultimately will be looking for in the preferred embodiments). Preferably, in embodiments where the feature is just a hash of the descriptor vector, the hash is approximately 20 bits long (e.g., 15-25 bits long). In embodiments where each feature is based on a pair of keypoints, the hash of the descriptor for each keypoint preferably is approximately 10 bits (e.g., 7-13 bits) long, or approximately 20 bits total if a hash is performed on the concatenation of the descriptor vectors for the two keypoints.

In other words, in embodiments where each feature is based on a pair of keypoints, the individual descriptor vectors preferably need to match less precisely. However, improved results often can be obtained nevertheless, because two distinct keypoints must match and because information regarding the relationships between keypoints also is taken into account.

It is also noted that in certain embodiments of the invention, the features for an image have been previously calculated and stored, so such features can be simply retrieved in step 62. Otherwise, the features are calculated on-the-fly in step 62.

In step 64, the identified features are added to the image-feature database 30. The nature of database 30 preferably depends upon the ultimate purpose of the image-identification system 10 and, to some extent, the nature of the features being utilized.

For example, in query-based embodiments where the goal is to identify the target images for a given query image and the features are direct hashes of individual descriptor vectors, the image-feature database 30 preferably includes a hash table (i.e., a kind of index) for identifying all images that include such features. In other query-based embodiments (e.g., where the feature includes other kinds of information, such as keypoint orientation), the image-feature database 30 includes other kinds of indexes (typically, inverted and/or reverse indexes) for quickly identifying all images that include a particular feature. In such embodiments, the new features are simply added to the appropriate hash table(s) or other index(es), e.g., using conventional techniques.

On the other hand, different data structures preferably are used if the image-identification system 10 is designed for clustering images based on visual similarity. In such embodiments, the data structures preferably are tailored to the particular clustering technique being used, and the new features ordinarily will be stored together with a pointer to the original image to which they correspond.

Upon completion of step 64, processing returns to step 61 in order to process the next image and add its features to image-feature database 30. In this way, database 30 preferably is populated with features from a large number of images.

Figure 5:
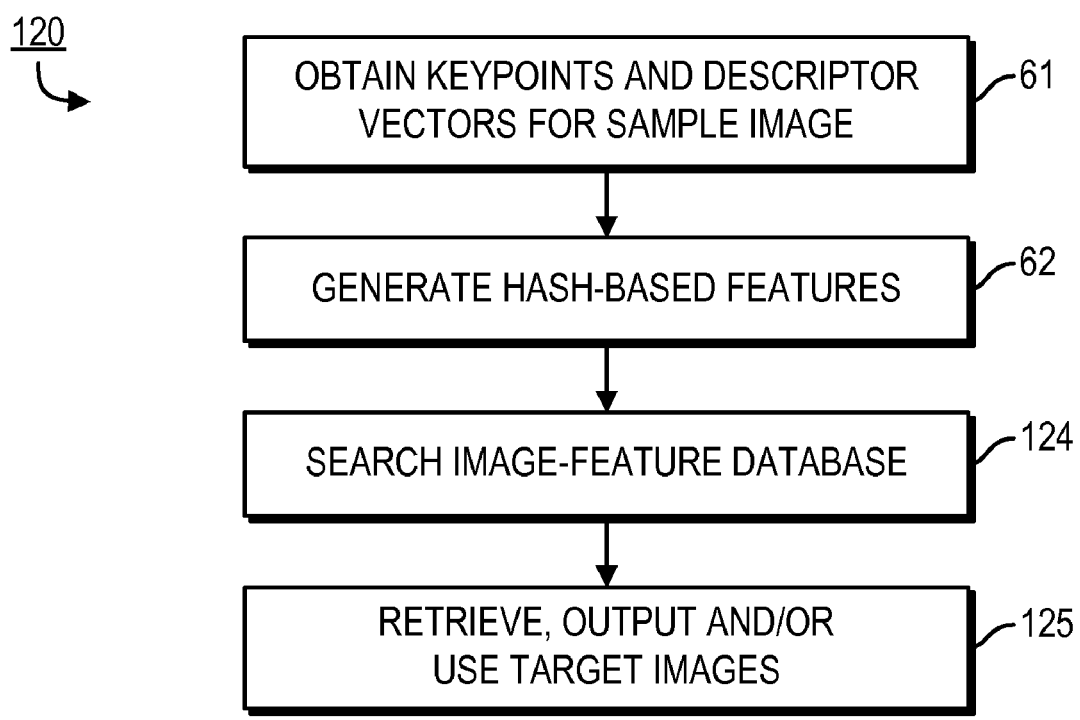
FIG. 5 is a flow diagram illustrating a representative process for identifying target images.

FIG. 5 is a flow diagram illustrating a representative process 120 for target images. In the preferred embodiments, process 120 is fully automated, so that it can be implemented in software or in any of the other ways described herein.

The initial steps 61 and 62 have been described above, and so the details need not be repeated here. However, the result of executing steps 61 and 62 for a sample image is to obtain a set of features for the image. It is noted that in certain embodiments, the sample image in this process 120 that was obtained in step 61 itself is drawn from the database 30. Also, although a single image is indicated in step 61, in certain embodiments of this process 120, multiple images are evaluated simultaneously, such as where the process 120 is being used for clustering images. In such cases, the features for all of the images that are to be clustered (or otherwise evaluated) preferably are available upon completion of step 62 of this process 120.

In step 124, the image-feature database 30 is searched for the individual features that were generated in step 62. Preferably, corresponding features for a large number of images previously have been stored into database 30 (e.g., in accordance with process 60, described above). For example, in one embodiment such searching is performed by querying a hash table or other index of database 30 with the individual features for the sample image. In another embodiment, the searching is performed pursuant to a selected clustering technique.

Finally, in step 125 any target images are retrieved, output and/or used. Preferably, the target images are those having a sufficient degree of similarity to the sample image obtained in step 61. For this purpose, similarity preferably is defined as having a sufficient number of features that are identical to corresponding features in the sample image. More preferably, an image is deemed to correspond to the sample image if $$sim(P, P') = \frac{|F \cap F'|}{|F \cup F'|} \geq Th,$$

where F is the feature set for the sample image P, F' is the feature set for the image under consideration P' and Th is a specified threshold.

In embodiments where system 10 concerns image retrieval (e.g., querying a database with the sample image to return any target images), the retrieval and presentation of target images can be accomplished, e.g., using conventional search-engine techniques. For example, in one embodiment, after querying one or more indexes, the images are sorted and displayed based on how many features they have in common with the sample image.

Alternatively, system 10 can be used for clustering a collection of images based on similarity. For such embodiments, a feature set preferably previously has been generated (e.g., as described above in connection with steps 61 and 62 of process 60) for each of the images in a database, and then the images are clustered based on those feature sets, e.g., using conventional clustering techniques and the following similarity measure $$sim(P, P') = \frac{|F \cap F'|}{|F \cup F'|}.$$

It is noted that in these embodiments, steps 64 and 65 are performed repeatedly and are highly interdependent with each other throughout the clustering process.

In any of the foregoing embodiments, the retrieval of target images in step 125 can be supplemented by checking for consistency among the corresponding features. That is, rather than simply counting the number of corresponding features between two photographs P and P', once those corresponding features have been identified, additional information can be used to verify the correspondence of the features in one photograph to those in the other photograph. Such additional information can include, e.g., scale and/or orientation of the keypoints that were used to generate the corresponding features. Thus, if two photographs are in fact identical or very similar, one would expect (1) the scales for such keypoints in one photograph to be a constant multiple of the scales for the corresponding keypoints in the other; and (2) the relative orientations among such keypoints in one photograph to be consistent with the relative orientations for the corresponding keypoints in the other.

System Environment

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of identifying target images, comprising:
    obtaining keypoints at different locations within a sample image and descriptor vectors for the keypoints, the descriptor vectors describing local image information around the keypoints, where each descriptor vector is an n-dimensional array;
    generating features based on hashes of data vectors that include at least one of the descriptor vectors, where each feature is a tuple comprising a hash value of each data vector and a quantization function mapping an orientation of each keypoint to a range of integers;
    searching for the features in an image-feature database; and
    retrieving and providing target images based on a number of the features for which corresponding features exist in individual database images whose features are represented in the image-feature database,
    wherein the hashes are performed using a hash function for which a probability that the hash of an arbitrary first vector corresponds to the hash of an arbitrary second vector is a function of an angle between the first vector and the second vector,
    wherein the hash function generates a characteristic data string from a data vector larger than the characteristic data string,
    wherein the arbitrary first vector is a first descriptor vector, and the arbitrary second vector is a second descriptor vector,
    and wherein each feature corresponds to two keypoints, and each feature is a tuple;
    wherein each tuple comprises: a hash value of a first descriptor vector for a first keypoint, a hash value of a second descriptor vector for a second keypoint, a first quantization function mapping an orientation of the first keypoint in relation to the second keypoint to a range of integers, and a second quantization function mapping an orientation of the second keypoint in relation to the first keypoint to the range of integers.

2. A method according to claim 1, wherein the features are hashes of individual ones of the descriptor vectors.

3. A method according to claim 1, wherein the hash function comprises an aggregation of binary comparisons to a plurality of selected hyperplanes.

4. A method according to claim 1, wherein the hash of the arbitrary first vector is equal to one if a dot product of a random vector and the arbitrary first vector is greater than or equal to zero, and is equal to zero if the dot product is less than zero.

5. A method according to claim 1, wherein the hash function is such that the probability that the hash of the arbitrary first vector corresponds to the hash of the arbitrary second vector is approximately equal to a function of the cosine of the angle between the first vector and the second vector.

6. A method according to claim 1, further comprising a step of displaying the target images in an order that is based on a number of features in the target images that are identical to corresponding features in the sample image.

7. A method according to claim 1, wherein the descriptor vectors have been generated using a Scale Invariant Feature Transform (SIFT) technique.

8. A method of identifying target images, comprising:
    obtaining keypoints at different locations within a sample image and descriptor vectors for the keypoints, the descriptor vectors describing local image information around the keypoints, where each descriptor vector is an n-dimensional array;
    generating features based on hashes of data vectors that include at least one of the descriptor vectors, where each feature is a tuple comprising a hash value of each data vector and a quantization function mapping an orientation of each keypoint to a range of integers;
    searching for the features in an image-feature database; and retrieving and providing target images based on a number of the features for which corresponding features exist in individual database images whose features are represented in the image-feature database, wherein individual ones of a plurality of the features are based on information regarding a relationship between at least two different keypoints, wherein the hashes are performed using a hash function for which a probability that the hash of an arbitrary first vector corresponds to the hash of an arbitrary second vector is a function of an angle between the first vector and the second vector, wherein the hash function generates a characteristic data string from a data vector larger than the characteristic data string, wherein the arbitrary first vector is a first descriptor vector, and the arbitrary second vector is a second descriptor vector, and wherein each feature corresponds to two keypoints, and each feature is a tuple;

wherein each tuple comprises: a hash value of a first descriptor vector for a first keypoint, a hash value of a second descriptor vector for a second keypoint, a first quantization function mapping an orientation of the first keypoint in relation to the second keypoint to a range of integers, and a second quantization function mapping an orientation of the second keypoint in relation to the first keypoint to the range of integers.

9. A method according to claim 8, wherein individual ones of a plurality of the features are based on information for exactly two different keypoints.

10. A method according to claim 8, wherein individual ones of a plurality of the features include an orientation of one of the at least two different keypoints relative to a line joining two of the at least two different keypoints.

11. A method according to claim 8, wherein individual ones of a plurality of the features include a parameter of a first one of the at least two different keypoints relative to a parameter of a second one of the at least two different keypoints.

12. A method according to claim 8, wherein the hashes are performed using a hash function for which a probability that the hash of an arbitrary first vector corresponds to the hash of an arbitrary second vector is a function of an angle between the first vector and the second vector.

13. A method according to claim 12, wherein the hash function comprises an aggregation of binary comparisons to a plurality of selected hyperplanes.

14. A method according to claim 8, wherein the hash of the arbitrary first vector is equal to one if a dot product of a random vector and the arbitrary first vector is greater than or equal to zero, and is equal to zero if the dot product is less than zero.

15. A method according to claim 8, further comprising a step of displaying the target images in an order that is based on a number of features in the target images that are identical to corresponding features in the sample image.

16. A computer-readable medium storing computer-executable process steps for retrieving images, said process steps comprising:

obtaining keypoints at different locations within a sample image and descriptor vectors for the keypoints, the descriptor vectors describing local image information around the keypoints, where each descriptor vector is an n-dimensional array;

generating features based on hashes of data vectors that include at least one of the descriptor vectors, where each feature is a tuple comprising a hash value of each data vector and a quantization function mapping an orientation of each keypoint to a range of integers;

searching for the features in an image-feature database; and retrieving and providing target images based on a number of the features for which corresponding features exist in individual database images whose features are represented in the image-feature database, wherein the hashes are performed using a hash function for which a probability that the hash of an arbitrary first vector corresponds to the hash of an arbitrary second vector is a function of an angle between the first vector and the second vector, wherein the hash function generates a characteristic data string from a data vector larger than the characteristic data string, wherein the arbitrary first vector is a first descriptor vector, and the arbitrary second vector is a second descriptor vector, and wherein each feature corresponds to two keypoints, and each feature is a tuple;

wherein each tuple comprises: a hash value of a first descriptor vector for a first keypoint, a hash value of a second descriptor vector for a second keypoint, a first quantization function mapping an orientation of the first keypoint in relation to the second keypoint to a range of integers, and a second quantization function mapping an orientation of the second keypoint in relation to the first keypoint to the range of integers.

17. A computer-readable medium according to claim 16, wherein the features are hashes of individual ones of the descriptor vectors.

18. A computer-readable medium according to claim 16, wherein the hash function comprises an aggregation of binary comparisons to a plurality of selected hyperplanes.

* * * * *